United States Patent [19]

Beierle et al.

[11] Patent Number: 4,757,497
[45] Date of Patent: Jul. 12, 1988

[54] LOCAL AREA VOICE/DATA COMMUNICATIONS AND SWITCHING SYSTEM

[75] Inventors: John D. Beierle, Freehold, N.J.; Brian Sherman, Marlboro, Mass.

[73] Assignee: Lan-Tel, Inc., Marlboro, Mass.

[21] Appl. No.: 937,548

[22] Filed: Dec. 3, 1986

[51] Int. Cl.[4] ............................................. H04J 3/02
[52] U.S. Cl. ........................................ 370/89; 370/85
[58] Field of Search ..................... 370/86, 89, 88, 85; 340/825.05

[56] References Cited

U.S. PATENT DOCUMENTS

4,460,994  7/1984  Scanlon et al. ...................... 370/88
4,491,838  1/1985  West ............................... 340/825.05
4,553,234 11/1985  Brandsma et al. .................... 370/86

FOREIGN PATENT DOCUMENTS

2538662 12/1962 France .
1243464  8/1971 United Kingdom .

OTHER PUBLICATIONS

Computer Communications, IPC Science and Technology press, Aug. 1979, pp. 165-176.
Akiyama et al., (International Switching Symposium): Speech-Path Selection and Inter-Processor Signalling in a Load-Shared Distributed Switching System.

Primary Examiner—Douglas W. Olms
Assistant Examiner—Min Jung
Attorney, Agent, or Firm—Wolf, Greenfield & Sacks

[57] ABSTRACT

A distributed, digital voice/data communications and switching system for connecting stations which may provide voice-only transmission, data only or voice and data. The system comprises one or more physical nodes, each serving (in an exemplary case) up to about 30 ports (i.e., station interfaces); nodes may be geographically distributed on the user's premises or one or more nodes may be collected together at a common location. The nodes are interconnected via a hierarchical network configuration formed of at least two, generally three, and perhaps even four interlocking networks. The first network is a slotted ring (the "regional" ring) employing coaxial cable to connect the nodes; it carries all control messages transmitted among the nodes, as well as the users' data traffic, using a frame which circulates continuously at about 20 Mbps. The second network is a "star" arrangement carrying PCM-encoded digitized voice traffic; at the hub of the star, in one of the nodes, is a digital voice switch. An optional third network provides a ring-type local area network (the "nodal ring") which connects together a multiplicity of stations at a given node. Each station may include an analog key telephone; further, a personal computer or data terminal may be connected to the phone for transmission purposes. The nodal ring uses frequency division multiplexing to support both analog voice and data transmission over twisted-pair wiring; in the node, the analog voice is digitized and connected to the star network, while digital data is connected to the regional ring for transmission to other nodes. A fourth (so-called "national") ring may be used to interconnect a plurality of regional rings, to allow the system to grow to greater size. Both the hardware and software are modular and may be distributed among the nodes. The software (firmware) comprises a number of processes (or modules) which operate independently of one another and communicate solely by means of messages transmitted over the system's rings and buses internal to the node(s).

13 Claims, 7 Drawing Sheets

LOCAL AREA VOICE/DATA COMMUNICATIONS AND SWITCHING SYSTEM

FIELD OF THE INVENTION

This invention relates to the field of communications and computers, broadly speaking; and, more particularly, to a communications (and switching) system for controlling the transmission of voice messages and data between a plurality of telephones and/or data terminals in a multi-nodal voice/data private telephone system.

BACKGROUND OF THE INVENTION

In recent years, telephone systems within offices and other organizations have increasingly made use of the concept of the private automatic branch exchange (PBX or PABX). Originally, the PBX handled only the communication of analog voice transmissions between a number of telephone extensions within an office, building or comparable environment and between those telephones and a lesser number of lines to a telephone company's central office. In recent years, there have also been PBX's which transmitted the voice signals in analog form, with analog-to-digital conversion (and digital-to-analog conversion) being handled directly at the telephone extensions. With the advent of computer technology has come the need to transmit digital information between personal computers and other data communications equipment co-located with telephones in similar types of environments. In an office, for example, an executive may have a computer terminal or other digital device in addition to a telephone. It is desirable in such environments to combine voice and data communications using wiring and equipment common to both types of transactions. This has led to the development of digital voice/data PABX equipment. One factor complicating the design of such equipment is the considerably different characteristics of voice signals in a telephone conversation and data signals within such systems. These data signals, of course, include not only those to be transmitted between data terminal equipment, but also those to be transmitted between different units of the PABX system.

Unfortunately, most digital voice/data PABX systems are designed optimally for networks of a particular size or particular limited range of sizes, in terms of the number of ports and telephones which may be accommodated. Outside the design range, the use of such a system may become uneconomical. To a growing company, this presents a dilemma: it can purchase a telephone system which is economical for its current size but which will become uneconomical as the company grows; or it can purchase a system larger than its current needs and uneconomical at that point but which will become economical as the company grows. Further, systems optimized for voice transmission may deal poorly with the handling of other data, and vice versa. Switching systems exist for controlling efficiently and economically small numbers of ports and other systems exist for handling large numbers of ports, but heretofore there has been no system available for addressing economically both (a) a digital PABX market spanning a range from just a few to up to about 960 ports and (b) voice and data transmission, including data for controlling the PABX system itself.

Recently, attention has been focused worldwide on all-digital telephones utilizing ISDN (integrated services digital network) technology. In this approach, analog-to-digital conversion, and vice versa, is made directly in the telephone and not in the connected switching system (whether public or private). A two-wire link is provided between the telephone and the switch, on which operates a pair of hydrid circuits with look-up table echo cancellation. Typically, data may be transmitted in each direction on this link at a combined rate of up to about 144 kbps; this consists of voice transmission at about 64 kbps, data transmission at about 64 kbps, and control information transmitted at about 16 kbps.

Of course, other transmission rates may be used. However, a pulse code modulated voice of eight bit companded quality at 8 kHz Nyquist sampling requires a 64 kbps channel. A user data channel capable of carrying asynchronous user stream of 56 kbps, as described in recent telephone company tariff filings, will also require a 64 kbps channel. Such transmission requirements imply either a four-wire link between the telephone and the switch, or else a two-wire link with circuitry at each end to permit sharing of the link between the two directions of transmission.

There are a number of disadvantages to this arrangement in a voice-data private switching system. Firstly, sometimes the link is not transparent to analog tone signals generated at the telephone during conversation; any such signals, which are used, for example, for remote control of voice mail systems, must in that case be recreated at the interface to the public network. Secondly, three channels serving different purposes must be mixed at one end of the link and separated at the other, implying circuitry for such operations. Thirdly, substantial bandwidth is dedicated to one user and cannot be shared with other users. Fourthly, the data bandwidth available at the telephone (data terminal) is limited to a maximum of 64 kbps. Fifthly, asynchronous data streams must be fed through a synchronous stream and extracted at the far end of the link. Sixthly, circuitry is required in the telephone itself for the conversion of voice signals from analog to digital form, and vice versa.

Another approach has used a voice switching system combining a star network for voice transmission and a loop network for transfer of control information, such as is described in French patent No. 2,538,662. In this known system, which utilizes the loop system described in French patent No. 2,127,876, a two level system of local and transit loops is employed; and computers used to control the common voice switch and routing and tarification translators are attached to the unique transit loop which interconnects all local loops by means of so-called "C-boxes". According to the French '662 patent, the port translation function, incorporating port and connection status information, is contained either in computers attached to each local loop or is contained in one of the port-serving computers on each local loop. This system provides service circuits (e.g., tone generators and tone receivers) on a common pool basis, with switched access to ports through the voice network. Although a plurality of access circuits are shown each with its own control computer, all connected to a common voice switch, all elements are apparently intended to be co-located; the system is not shown to be multi-nodal.

The system shown in those French patents is subject to several disadvantages. Firstly, use of a two level loop system (with relatively high level loops) entails further circuitry (including a C box) which would be unnecessary in small system applications of under 1000 ports, as in PBX's. Secondly, use of dedicated computers for network control and (rate and route) translation functions is wasteful of resources in small systems. Thirdly, switching access to service circuits is wasteful of voice network and control computer capacity and generates avoidable control messages adding to the traffic on the loop network. Fourthly, if data message switching is to be provided, such messages must be switched synchronously through the voice switch, which would entail asynchronous-to-synchronous conversion (and vice versa), and would be wasteful of bandwidth compared to an asynchronous packet switching approach. Fifthly, as stated above, the components of the system are apparently co-located and are not obviously distributable into different locations in a building.

It is therefore an object of the present invention to provide a system for voice and data transmission in a PABX environment, while substantially obviating the above-noted disadvantages of known systems.

It is a further object of the invention to provide such a system which is economical in use.

Yet another object of the invention is to provide such a system wherein a large range (i.e., from a low of about 30 to a high of at least 960 ports) may be accommodated economically, with system costs growing in a roughly linear relationship with the number of ports attached to the network.

Another object of the present invention is to provide a link from a voice/data telephone to a private switching system which eliminates the above-cited disadvantages of a link based on ISDN technology.

SUMMARY OF THE INVENTION

According to the present invention, a distributed, digital voice/data PABX serves and connects ports which may provide voice-only transmission, data only or voice and data. The system comprises from one to 32 (or more) physical nodes, each serving (in an exemplary case) up to about 30 ports. The nodes may be geographically distributed on the users' premises or one or more nodes may be collected together at a common location. The nodes are interconnected via a hierarchical network configuration formed of at least two, generally three, and perhaps even four interlocking networks. A first, ring type of network (the "regional" ring) connects the nodes and carries all control messages transmitted among the nodes, as well as the user's data traffic. Voice traffic is digitized and carried on a star network using PCM coding, at a 2.048 Mbps rate. An optional third network provides a ring-type local area network (LAN) which connects together a multiplicity of phones at a given node. One of the nodes contains a digital voice switch which serves the entire system. A fourth (so-called "national") ring may be used to interconnect a plurality of regional rings, to allow the system to grow to greater size.

The regional ring contains one frame which circulates continuously at about 20 Mbps (though other types of rings, such as a "slotted" ring could be used, instead). The frame is either busy (i.e., contains a message), or it is idle. Source removal of messages is practiced. This regional ring (which, of course, is a local area network) carries control message traffic as well as user's data traffic.

Regardless of the number of nodes, the system functions as a single, integrated PABX, with total transparency of features over the entire system. Both the hardware and software are modular and may be distributed among the nodes. The user is unaware, though, that the system is supported physically on separate nodes. The software (firmware) comprises a number of processes (or modules) which operate independently of one another and communicate solely by means of messages transmitted over the system's rings and buses internal to the node(s). Each message contains control information, the source address, the destination address, the text of the message and cyclic redundancy check information.

The invention particularly addresses the control arrangement allowing the transmission of voice messages, data messages and control information over such a network between a plurality of stations including data communications devices (or terminals) and analog key telephones to which personal computers or data terminals also may be connected for transmission purposes and a switching node of a multi-nodal voice/data private telephone switching system.

A first advantage resulting from this system is that a path is provided which is transparent to analog signals, so that the DTMF keypad on the telephone can be used for remote signalling during conversation. A second advantage is that the synchronous voice and asynchronous control/data channels are never mixed together in a common digital stream. A third advantage is that the data and control band width is shared among a plurality of users. A fourth advantage is that access to a 2 Mbps (or higher) local area network (LAN) is available at the telephone station. A fifth advantage is that the system's data and control information is asynchronous throughout and, therefore, no conversions are required from asynchronous to synchronous transmission and vice versa. A sixth advantage is that digital encoding and decoding of analog voice signals takes place in the switch and not in the telephone, simplifying its complexity.

Further advantages include at least the following: Only one local loop is required (though a second local loop may be used to additional benefit). The transit loop of the French system is not necessary. Common background functions such as network control, routing translation and port translation and status are handled by the computers controlling the ports and may be readily distributed over these computers in various ways, to distribute the processing load. Service circuits are provided on a multiplexed basis in each node and do not have to be reached through the switching network. Further, the loop control circuits combine packet switching of data with the transmission of control messages on the control loop.

Additional advantages will become apparent from the detailed description below, which should be read together with the accompanying drawing. The invention is more particularly defined in the claims appended to the end of the detailed description.

DETAILED DESCRIPTION OF AN ILLUSTRATIVE EMBODIMENT

System Topology

Figure 1:
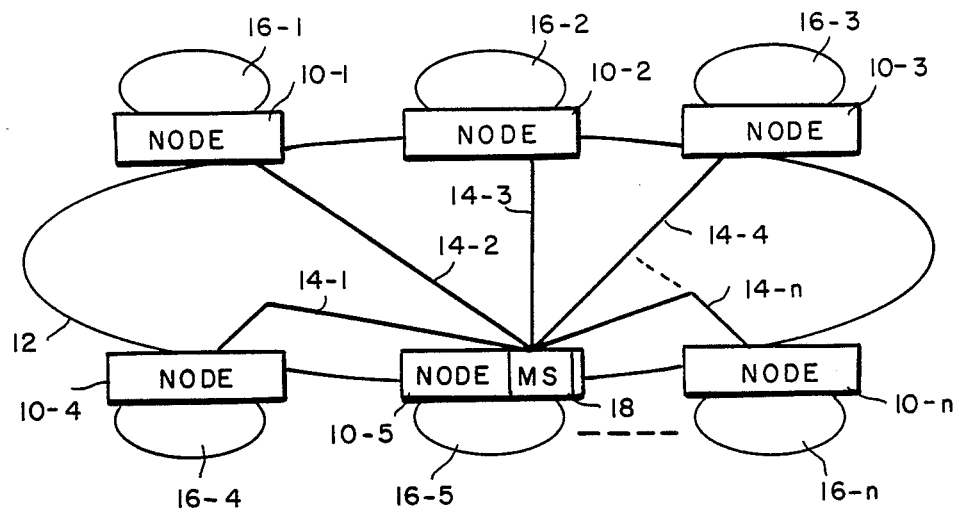
FIG. 1 is a diagrammatic illustration of the system architecture of the present invention, showing for purposes of exemplification a system of six nodes.

FIG. 1 shows the overall topology of the present invention. Three communications networks interrelate a plurality of nodes 10-1 through 10-$n$, six such nodes being shown in the drawing. The first network is a high-speed ring 12, called the "regional ring", which supports data traffic between nodes. Physically, it is a coaxial cable type of ring. Operationally, a data packet continually circulates over this ring at a rate of about 20 Mbps, continually passing control, address, data and station information to each node in the network. The second network is a PCM (i.e., pulse-code modulation) highway configured as a star topology and represented by paths 14-1 through 14-$n$. The PCM highway links voice traffic between the nodes. The third network is actually a series of networks, one per node, called "nodal rings". Each of these nodal rings 16-1 through 16-$n$ connects the associated node's line interface ports with corresponding individual stations (i.e., telephone sets and data units).

To support the PCM star network, a non-blocking master switch module (MS) 18 is installed in one of the nodes. In the illustration, the MS module is in node 10-5, but it could be in any node. The MS module acts as the focal point of the star arrangement; each PCM highway path 14-$i$ links one of the nodes 10-$j$ with the MS module (and via that module, with other nodes). That is, the MS module is provided with a number (e.g., 32) PCM interfaces that accept twisted-pair voice communications paths from up to a corresponding number of nodes. Each node routes PCM voice signals over its twisted-pair PCM highway path to the MS module, which in turn routes the voice signals to the proper node and destination port in the system. The PCM highway operates in accordance with an existing CCITT standard, with a data transmission rate of 2.048 MHz.

The nodal rings physically utilize the twisted-pair wire which connects the ports to the station equipment; operationally, each nodal ring loops the node's stations, forming a continuous nodal data communications ring. Operationally, the nodal rings bridge the individual stations to the regional ring. Information from each nodal ring's data packet is selectively copied into the regional ring packet, and vice versa, enabling system wide data communication.

Node Structure

Figure 2:
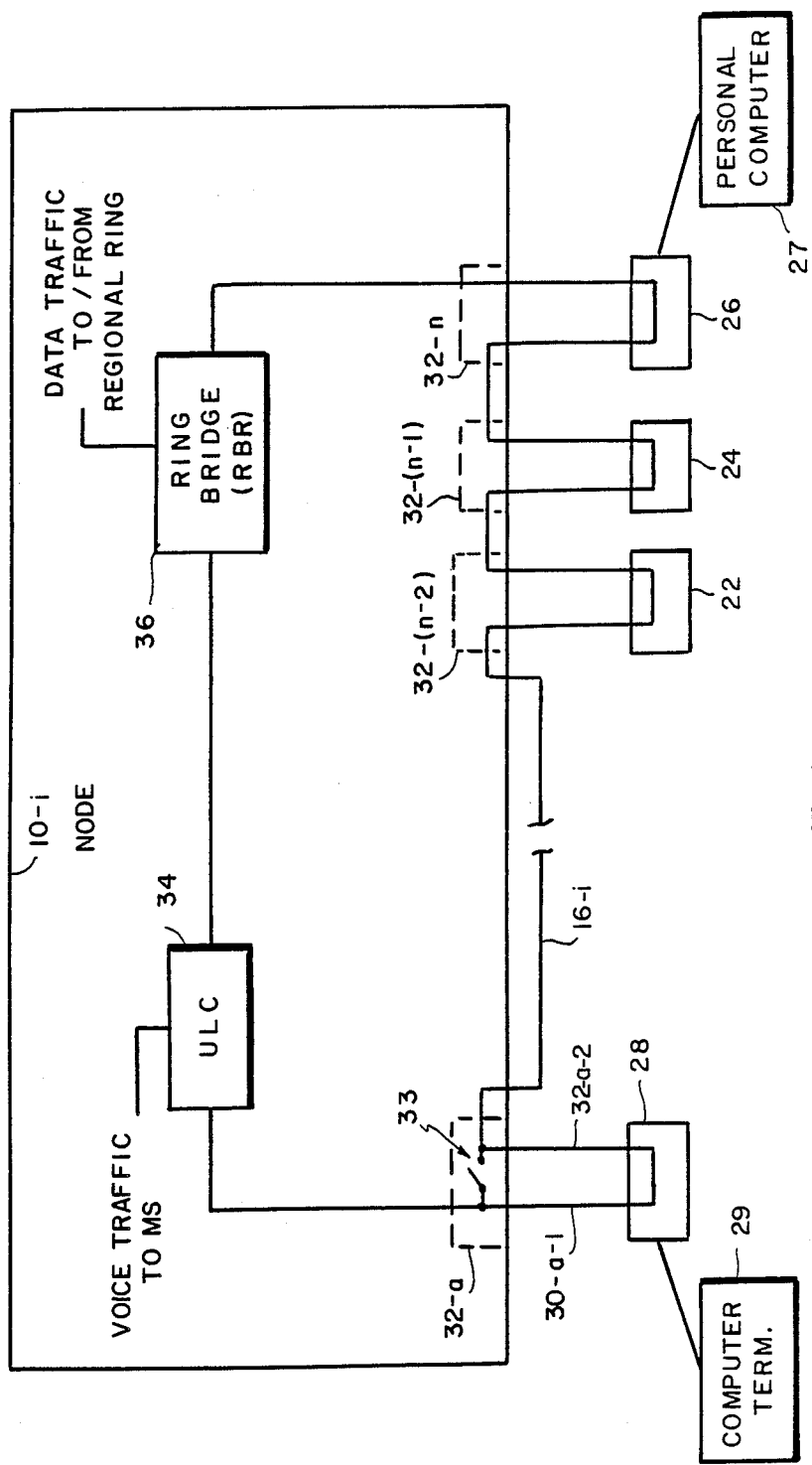
FIG. 2 is a diagrammatic illustration of a node and its nodal ring according to the present invention.

FIG. 2 shows in slightly greater detail the arrangement and functionality at each node, for interconnecting individual stations with the regional ring, for data traffic, and with the PCM highway, for voice traffic. An exemplary node 10-$i$ supports a number of stations on a nodal ring 16-$i$. In the illustration, two of the stations are simply telephones 22 and 24; a third station 26 is a telephone to which a personal computer 27 is connected (what is referred to herein as a local area network telephone, or "LANphone"); and a fourth station 28 is a "pad" or interface for connecting a computer terminal 29 directly to the nodal ring. Each station is connected into the nodal ring via two pairs of twisted wires, such as the first pair 30-$a$-1 and the second pair 30-$a$-2 connecting station 28 with port 32-$a$ of node 10-$i$. Each twisted pair carries both voice and data traffic signals, using frequency division multiplexing to keep the two types of signals separate electrically and operationally. These two twisted pairs provide a four-wire analog voice connection between each LANphone and the node. This configuration eliminates the need for two hybrid circuits per local area network telephone (i.e., one in the telephone and one in the switch). Within each such telephone, a circuit providing a side-tone replaces the hybrid. Mixing of the data and analog voice transmission is provided by an audio multiplexing circuit internal to each phone station and by a corresponding audio demultiplexing circuit in the node's port. The LANphones also contain encoders and decoders for data transmission. For additional reliability, each port may also include bypass or switching circuitry such as the switch 33 figuratively shown at port 32$a$; in the event of a failure in station 28, switch 33 may be closed, to bypass station 28 and twisted pairs 30-$a$-1 and 30-$a$-2, to allow the nodal ring 16-$i$ to continue to operate.

The data traffic on ring 16-$i$ may be of two types. First, a low speed channel for control information at about 100 bps may be provided by on-off keying of a 16 kHz signal, so that both the data rate and the carrier rate are kept out of the voice band. Second, a 2 Mbps LAN may be operated over the same wiring. In most situations, probably only one of the two data transmission systems would be employed, but both may be employed at the same time, if it is so desired.

Figure 3:
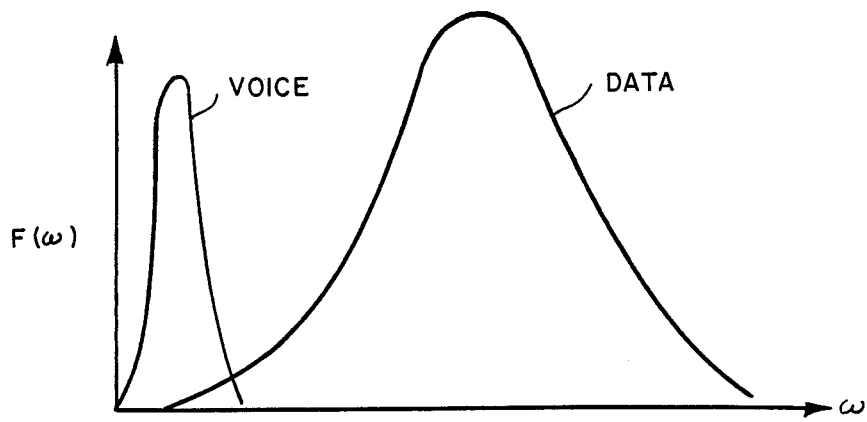
FIG. 3 is a diagram of the spectrum of data-over-voice communications employed in the nodal ring of FIG. 2.

FIG. 3 shows the desired spectral characteristics of the line coding technique used on the nodal loop. This second order characteristic can be obtained by using (for example) the well-known HDB3 encoding technique. The objective is, of course, to minimize spectral energy from the data signal in the band-limited voice band under about 3.8 kHz.

The local area network phone 26 may be equipped with a socket (e.g., an EIA standard socket) into which data terminals and personal computers may be plugged.

Internal to the node, the nodal ring is connected to a so-called universal line card (ULC) 34 which contains circuitry to link the nodal ring to the PCM star network for voice traffic, and to a so-called ring bridge (RBR) 36 which contains circuitry to link the nodal ring to the regional ring for data traffic exchange. A 2 Mbps data packet circulates along the path of nodal ring 16-$i$, to all stations on the nodal ring. The RBR 36 contains network interfaces, a protocol conversion subsystem, and switching and buffering circuits which examine destination addresses of messages on the nodal ring and on the regional ring. Upon detecting a message on the regional ring and destined for the node, the RBR routes it into the node. Conversely, upon detecting on the nodal ring a message destined for another node, the RBR routes that message onto the regional ring. Messages for controlling lamps and liquid crystal (or other) display elements on the LANphones may also be sent over the nodal ring.

The Hierarchy

Figure 4:
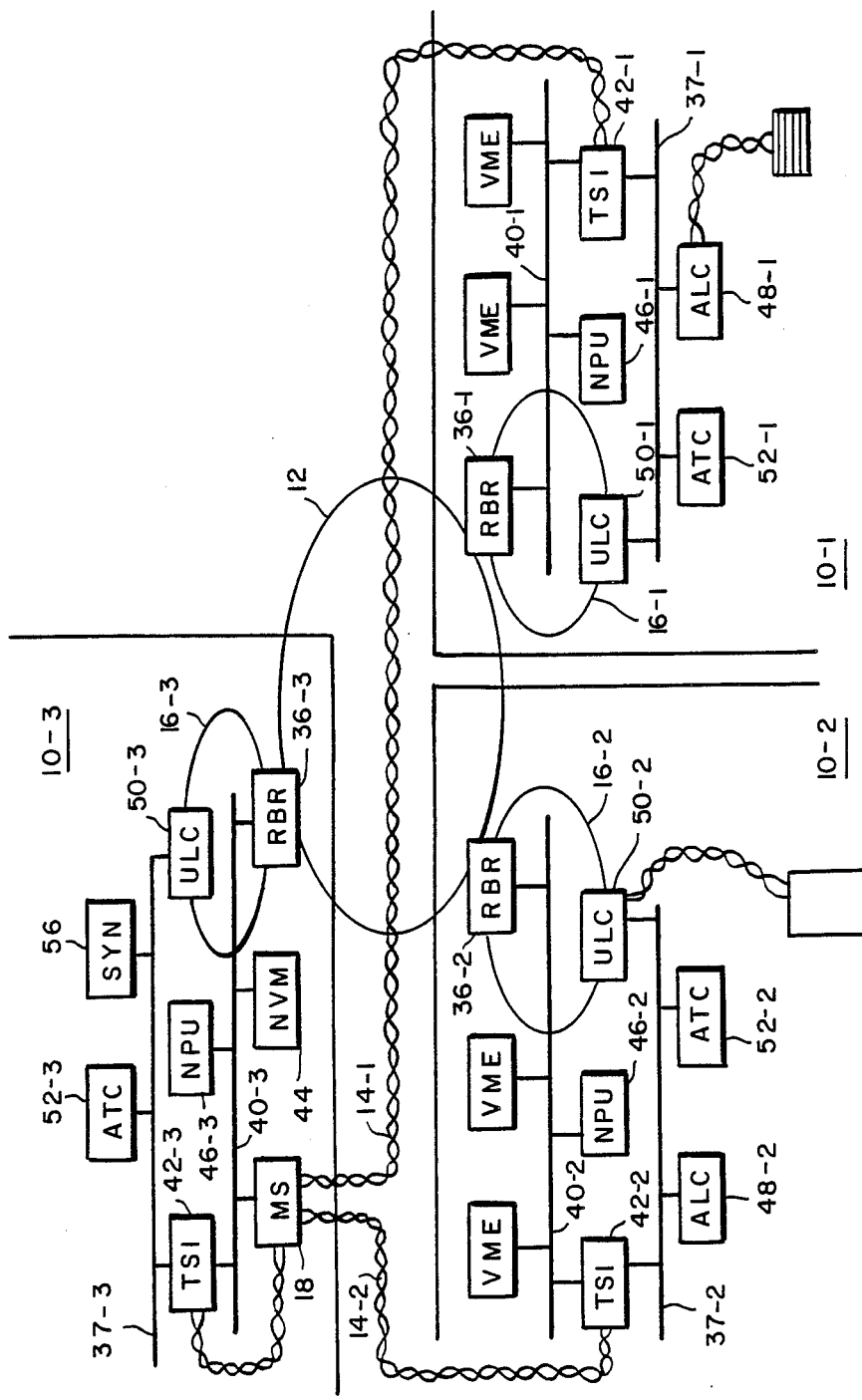
FIG. 4 is a block diagram showing a three-node voice/data communications system according to the present invention, particularly illustrating the hardware modules in each node, to show the voice and data networking communications paths.

In FIG. 4, a basic system of three nodes (10-1, 10-2 and 10-3) is shown. As depicted there, each node "i" of the system employs a double bus structure consisting of a nodal bus 37-*i* (i.e., 37-1, 37-2 and 37-3, respectively) and a bus 40-*i* (similarly, 40-1, 40-2 and 40-3, respectively) for connecting hardware modules within the node. This second bus may, for example, be an industry standard VME bus or other bus of suitable characteristics. Use of a conventional bus such as the VME bus allows a node to interface to other existing systems or devices. The boxes labelled "VME" in FIG. 4 are intended to represent other non-specific VME bus-compatible devices which a user may wish to connect into a node for data transmission or other purposes. These VME boxes may, of course provide interfaces to other data communications networks, as well.

Node Modules

The additional modules present in each node of FIG. 4 will now be briefly discussed, with further discussion presented in later portions of this description.

Within each node, a node control module contains all control elements on cards which are interfaced to the VME bus 40-*i*; these control elements include the Time Space Interface (TSI) card 42-*i*, non-volatile memory 44-*i*, a Nodal Processing Unit (NPU) card 46-*i* and an RBR card 36-*i*. Systems with two or more nodes also have a Master Switch module 18 in one of the nodes; this module is connected to the VME bus, as well. All nodes supporting voice stations also employ a number of other cards/modules which may be connected to the VME bus. These include Analog Line Cards (ALC's) 48-*i*, Universal Line Cards (ULC's) 50-*i* and Analog Trunk Cards (ATC's) 52-*i*.

The ALC cards contain ports for accepting voice signals from standard (i.e., type 2500) analog telephones with tip and ring interface. The card converts incoming voice signals to PCM format and passes them onto the nodal PCM bus for routing to the appropriate port (on an ALC, ULC or ATC), as determined by the node's control module.

The ULC card accepts analog voice signals from non-2500 type telephones, digitizes the voice traffic into PCM format and passes it onto the nodal bus for routing, as described for the ALC card. The ULC card also passes digital data and control signals from the data interface of a station. The digital traffic and control information on the nodal ring data packet passes through the ULC without any processing and is supplied to the RBR card for routing to another local data device or onto the regional ring for transmission to another node.

The ATC card interfaces voice traffic on the nodal PCM bus to external trunks, under control of the node's control module.

The node control module provides system control functions which can be divided into three functional areas: (1) voice traffic control, (2) data traffic control and (3) general system processing control. Voice traffic control employs three types of control cards: the TSI's (which reside in all nodes), the MS card which resides in one node (and is not required in single node systems) and a Sync Network (SYN) card 56 (which resides in the node containing the MS and interfaces the PCM highway to the MS). Data traffic control employs the RBR which resides in all nodes which pass data traffic. General system processing control utilizes a Non-Volatile Memory (NVM) 44 (which resides in just one node) and the NPU's (one in each node).

Voice traffic is switched through the system under control of the TSI, MS and SYN cards. These elements work in conjunction with the NPU to monitor line interface cards (i.e., ULC's, ATC's and ALC's) and control the passing of PCM traffic along each nodal bus and the system's PCM highway star network.

The TSI card has certain functions which are the same in single- and multi-node systems, and other functions which differ in those two cases. In a single node system, the TSI card monitors all voice ports and controls all voice traffic switching within the node. Any voice traffic passing to or from any trunk or line card is controlled by the TSI, over the nodal bus. The TSI interfaces to the nodal bus to control the passing of voice signals between line cards, and also interfaces to the VME bus to receive system control commands from the node's NPU. In a multi-nodal system, the TSI cards monitor voice ports, but do not perform the voice switching function. Instead, they place voice signals taken from the nodal PCM bus onto the PCM highway. The PCM highway from each node interconnects to the MS and SYN cards. The MS takes control of switching all PCM-encoded voice signals from all nodes in the system, while the TSI's monitor line cards and place each node's PCM signals onto the PCM highway. The TSI (1) generates all addressing information for voice traffic passing over the nodal bus; (2) stores all status information received from local line cards, for monitoring by the NPU; (3) decodes all DTMF signals from all local line cards; (4) stores and generates all call progress tones and DTMF tones needed for local line cards; and (5) transmits and receives system voice traffic from all nodes in a network, via the PCM highway.

The master switch required for voice traffic switching in a multi-node system occupies space in only one node. It is comprised of a master switch (MS)/conference control (CC) card module (MS) and sync network (SYN) cards. TSI modules place local voice traffic onto the PCM highway, which carries it to the SYN card in the master switch. The SYN card consists of line drivers (one per node), for interfacing (for example) 32 TSI cards to the 32 ports on the MS card (in the maximum system configuration of this exemplary embodiment). The line drivers compensate for varied distances between nodes, while aligning PCM voice signals to the timing of the MS card. The MS generates a 2.048 MHz master clock signal onto which each TSI locks (using conventional phase-locking loop techniques) for synchronization. The actual switching of voice traffic from the TSI's into the network is controlled by the MS, with connections between voice channels being accomplished by an address map stored in one or more NPU's in the system. Thus the functions of the MS are: (1) to generate the master clock signal; (2) to control PCM traffic to and from the sync network via the nodal buses; (3) to buffer all incoming PCM voice traffic before switching; (4) to switch PCM voice traffic; and (5) to interface the PCM channel address map to the VME bus for system control. The MS also contains circuitry for performing conferencing functions.

Data Traffic Control

Figure 5:
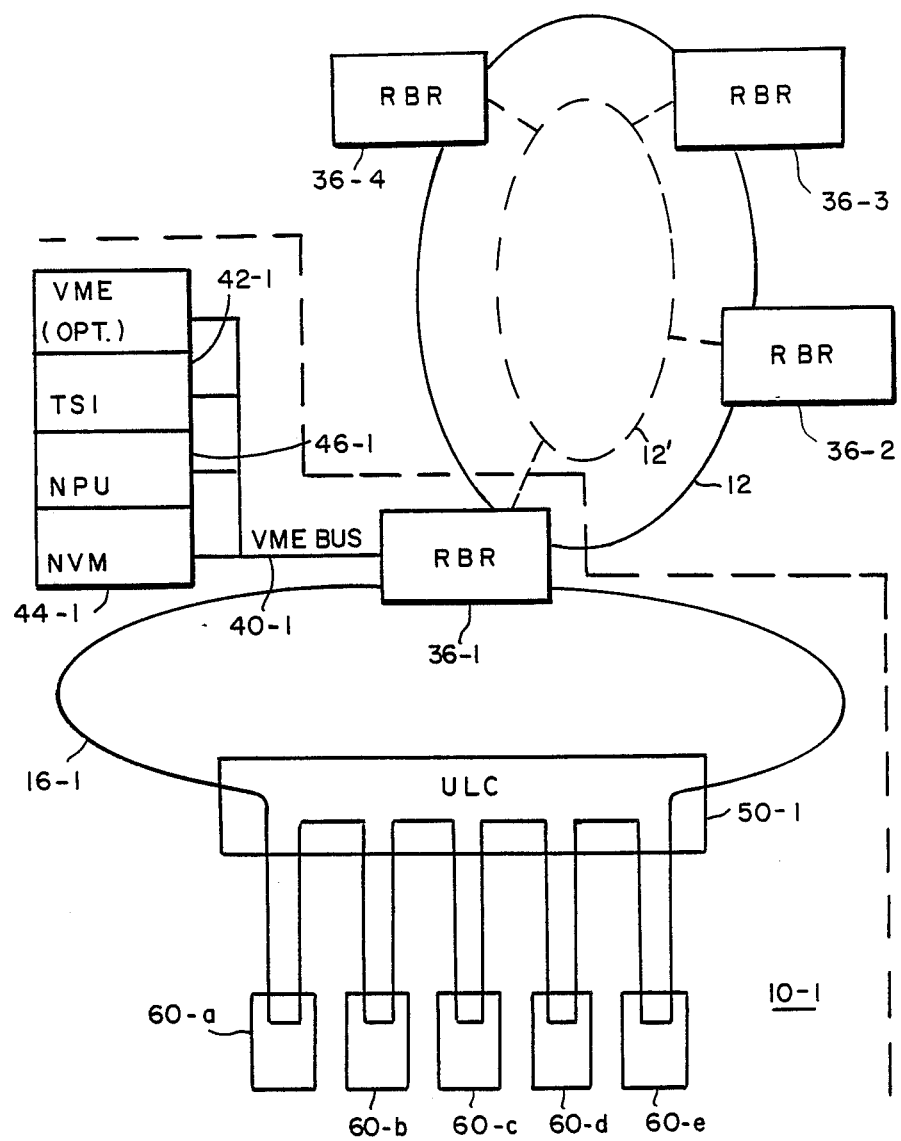
FIG. 5 is a further diagrammatic illustration of a four-node system according to the present invention, showing the hierarchy of rings which support data traffic.

Digital data and control signals are switched through the system over a hierarchy of networked nodal and regional rings. The arrangement will be readily understood by reference to FIG. 5. Nodal rings such as the single illustrated nodal ring 16-1 operate at a data transfer rate of about 2 Mbps over twisted-pair wiring to each station (e.g., stations 60-a through 60-e); the regional ring 12 operates at a much higher rate, such as 20 Mbps, utilizing conventional coaxial local area network connections between co-located or geographically dispersed nodes.

Each node in the system has a nodal ring which provides an intra-node communications path, though only one such nodal ring 16-1 is shown (for a node 10-1). Operationally, the nodal ring loops through each port on the node's ULC (e.g., 50-1) and out to each station 60-a through 60-e. In each station, the nodal ring passes through a data communications interface (not shown) which bridges data and control information onto the nodal ring. The nodal ring also loops through the node's RBR card (e.g., RBR cards 36-1 through 36-4 for each of nodes 10-1 through 10-4, respectively). The RBR provides an interface to the node's VME bus 40-1 for data transfer control functions via the node's NPU 46-1. Thus the RBR is the data communications bridge between the nodal and regional ring in a multi-nodal system.

A coaxial regional ring 12 loops through each node's RBR card in a multi-nodal system, providing system networking and expansion via interconnection of the nodal rings in the network. For increased reliability, a second regional ring 12' may be provided, as well as switching circuitry (not shown), which may be used to connect the two regional rings 12 and 12' so as to bypass inoperative nodes and portions of the coaxial cable of ring 12 if a cable failure occurs. Any data or control information from a nodal ring that is destined for another node bridges from the nodal ring to the regional ring through the local RBR.

The RBR card on the VME bus on each node provides interconnections between system control processors, nodal rings and the regional ring. During data transfer operations, the RBR enables all data comunication control processing functions to be performed as it bridges and buffers data between the regional and nodal rings. The RBR enables multiple devices on the VME bus to obtain access to either ring easily. All bridging functions performed by the RBR are transparent to any device on the VME bus.

The nodal rings and the regional ring are conventional so-called "slotted" rings. That is, one fixed slotted message (or packet) circulates on each of those rings, retrieving or leaving data and control information behind it as it passes through each port or RBR.

System Software

Figure 6:
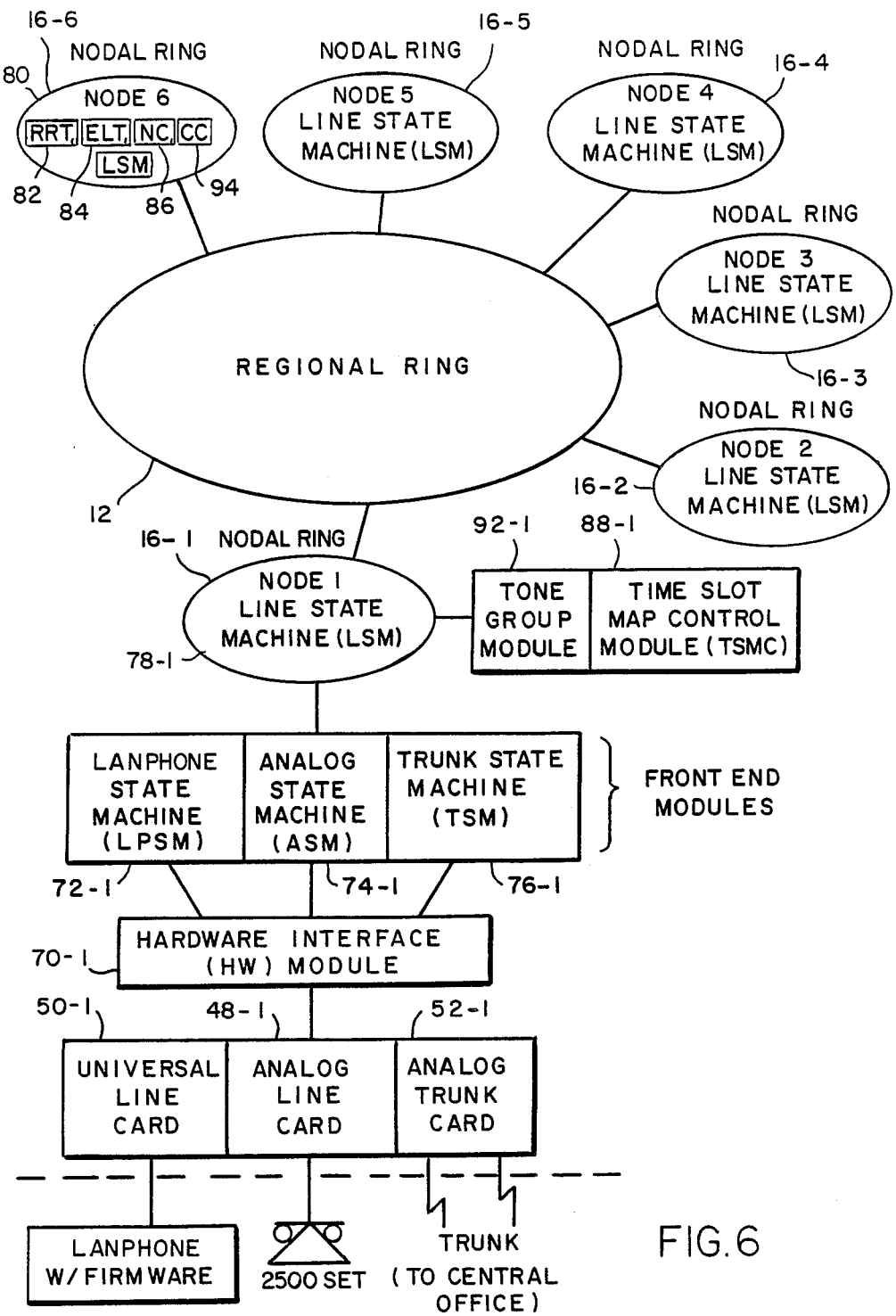
FIG. 6 is a diagrammatic illustration of the software modules employed in a system according to the present invention.

System flexibility is greatly enhanced by the use of a highly modularized software architecture. The software architecture is message based and may be distributed throughout the system via each node's NPU. The NPU card in each node is identical; software modules residing on each NPU card are similar for node control functions; one node in the network, though, has additional software modules in its NPU for specific system-wide tasks as well as node control processing. These system control software modules may be installed in more than one NPU, to allow any NPU to carry out the system-wide tasks should the selected system control node fail to perform correctly. The major system software modules and their interrelationship are depicted in FIG. 6.

The Hardware Interface Module (HWI) 70 at each node scans real time events within the node. These events include, for example, changes in on-hook and off-hook conditions. The HWI converts these real-time events to a message structure and buffers and provides the messages to an appropriate one of the node's state machine modules 72, 74 and 76.

The state machine modules 72-76 (also referred to as "front-end machines," or "FEM's") decode station event messages sent from the HWI module. State machine module 72 decodes events generated by ULC 50; state machine module 74 decodes events generated by ALC 48; and state machine module 76 decodes events generated by ATC 52. Each of the state machine modules (FEM's) performs its decoding operation in a manner unique and appropriate to the type of interface it is supporting.

Decoded messages from the FEM's 72-76 are provided to Line State Machine module (LSM) 78, which responds to these decoded messages by providing dial tone (as well as ring and busy signals) for off-hook events within the node. During the traffic routing process, a portion of which is described below, these modules poll the RRT, ELT and NC software modules (described below) on the NPU in node 80, that is processing system-wide functions. These system-wide modules provide information for least cost routing of external calls (a conventional function which will not be described in any detail as it does not comprise part of the invention), station restriction profiles, and hardware control processes.

The Rate and Route Translator (RRT) module 82 defines local number translations (i.e., translations from extension numbers in the network to physical telephone node and port connection paths) and provides least cost routing on a system-wide basis for all calls. This module responds to polls from the LSM in each node which performs the connections of the calls for its node.

The Extension Line Translator (ELT) module 84 stores line status and profiles for each class of service and restriction, on a system-wide basis. The ELT module responds to polls from the LSM in each node, providing the LSM with information which enables it to enforce the user profile plan for all extensions.

The Network Control Path (NC) module 86 sends system traffic control signals to the TSI modules in each node, via the TSMC module in the corresponding node.

The Time Slot Map Control (TSMC) module 88 controls hardware functionality in the associated node, by responding to network control signals from the NC module to control the node's TSI card.

The Tone Group (TG) module 92 controls tone generation to stations on the associated node, by responding to signals from the state machine of that node.

The node 80 may also include a Conference Control (CC) module 94 for controlling the conferencing of voice calls on a system-wide basis. The CC, if present, sends control signals to the MS card and the state machine modules, instructing them to set up the desired conferences.

System Control

System processing and control functions are performed by means of the NPU residing on the VME bus in each node. In a multi-node system, processing is distributed among nodes by having the NPU's perform interrelated tasks that are communicated over the regional ring. System processing is further distributed to the software (or firmware) modules allocated to each node and station (allowing each station to transmit control information to its node). The database for all system configurations is stored at one node within the system (and may be duplicated at one or more additional nodes). The NVM card 44 stores the database information, providing a central point of reference for station numbering, system call processing features, trunk call routing, statistical data, station profiles and restrictions. The NVM card connects to the VME bus within the designated node 80, giving it access to the control functions provided by the NPU's.

Call Processing—An Example

Figure 7A:
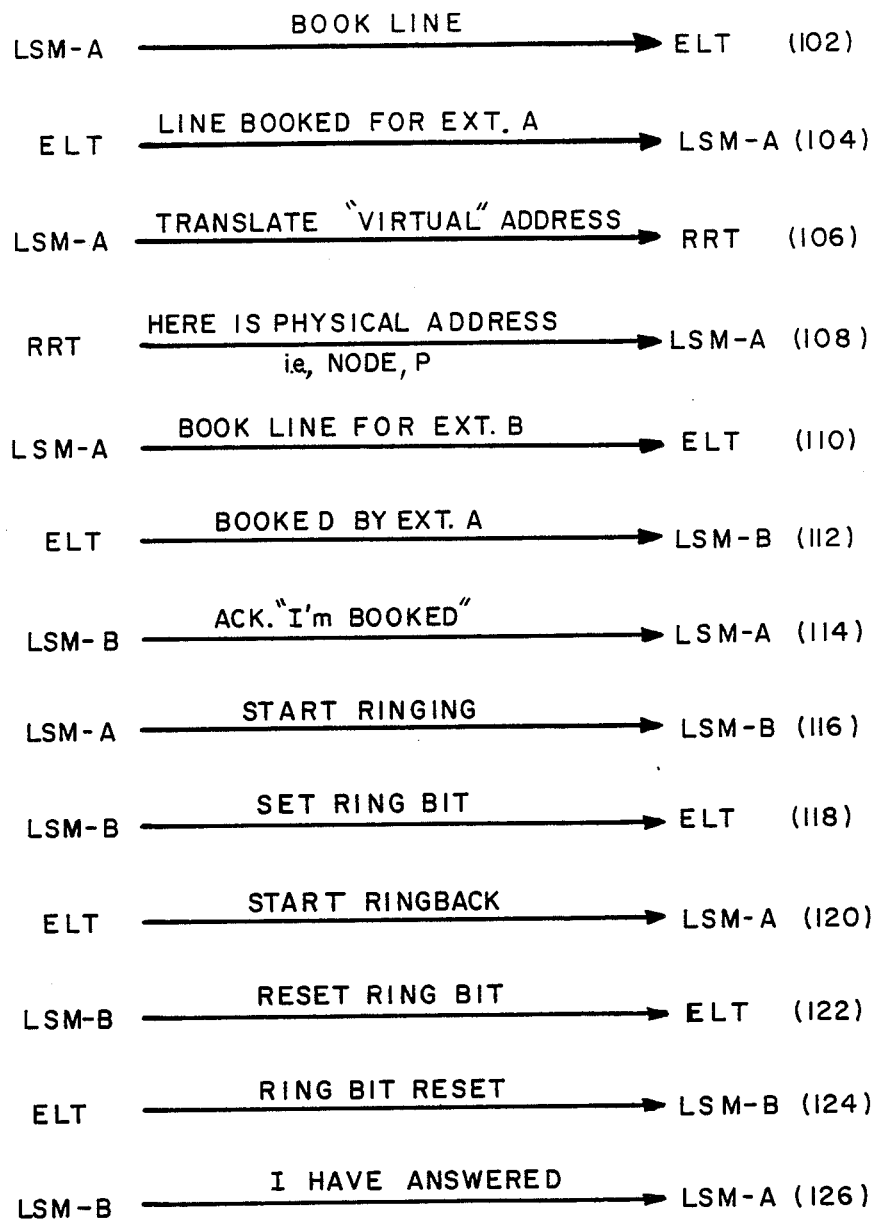
FIGS. 7A and 7B are collectively a diagrammatic illustration of an exemplary sequence of steps according to the present invention, for placing a call from a first station (i.e., telephone or data terminal) on the system to a second station on the system.
Figure 7B:
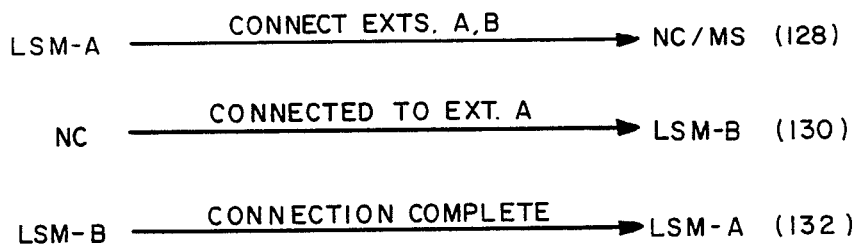
Figure 8:
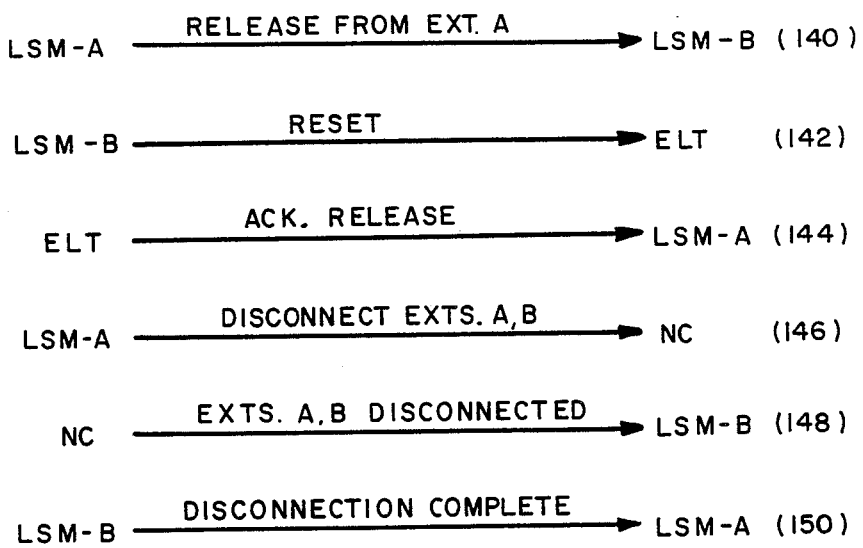
FIG. 8 is a diagrammatic illustration of an exemplary sequence of steps according to the present invention, for disconnecting the connection established in FIGS. 7A and 7B.

With reference to FIGS. 7A, 7B and 8, a step-by-step example will now be given of the operation of the system hardware and software to place a call from a station at a first extension (Ext. A) to a station at a second extension (Ext. B). The placement of an outside call via the telephone company trunk lines is not materially different.

The call placement sequence begins with Ext. A going off-hook, which causes the ALC or ULC to provide an off-hook signal which is detected by the associated HWI. The HWI sends a message to the corresponding FEM (74 or 72) which tells the LSM, which instructs the ELT to record (i.e., "book") the status of Ext. A as "in use" (step 102). The ELT then sends back to the LSM an acknowledgement that it has booked Ext. A as busy (step 104).

Upon receiving that acknowledgement, the LSM for Ext. A (hereafter referred to as LSM-A) sends an appropriate status acknowledgement (call progress) signal to the state machine module (i.e., front-end machine) 72–76 and commands the TSMC module to activate the Tone Group module to send dial tone to Ext. A.

The user, upon receiving dial tone, begins to place the call by dialing digits of the destination telephone number. Each digit is captured by the HWI, which sends a corresponding signal or message to the front end machine; the FEM communicates each digit to LSM-A. LSM-A looks at each digit as it is generated, to determine what kind of call is being placed.

Once it has identified the type of call being placed and the destination telephone number, LSM-A then begins routing and connection activities. In this example, of course, the call is identified as an internal call to another extension. LSM-A, having collected the digits of the destination extension number (i.e., Ext. B), next sends a message to the RRT requesting that the RRT translate the extension number (which may be considered a "virtual" address) to an actual physical address number in the system (step 106). The RRT responds (step 108) with the physical address for Ext. B.

Next, LSM-A sends a message to the ELT to determine the status of Ext. B and to "book" Ext. B if it is not already busy (step 110). If Ext. B is busy, a message to that effect is sent back to LSM-A, LSM-A notifies the front-end machine and the front-end machine notifies the TSMC to send a busy signal; the TG module, under control of the TSMC, sends a busy signal back to Ext. A. Assuming Ext. B is not busy, the ELT sets its status to busy and sends a message to the LSM which services Ext. B, (hereafter "LSM-B") advising it that Ext. B has been booked by Ext. A (step 112). LSM-B then acknowledges the booking of Ext. B. by sending an appropriate message to LSM-A (step 114). LSM-A then sends a message to LSM-B to initiate a ring signal at Ext. B (step 116); LSM-B "tells" its front-end machine, FEM-B. FEM-B, upon receipt of this message, causes its TSMC to initiate a ring signal from the Tone Group module to Ext. B via the associated HWI and ALC. LSM-B also sends an acknowledgement signal back to the ELT, which sets a status bit indicating that Ext. B is ringing (step 118). The ELT also sends a ringback message to LSM-A, which sends it to the FEM-A; this causes FEM-A to supply a ringback signal to Ext. A (step 120) so that the caller will hear that Ext. B is ringing; the ringback tone, of course, comes from the TSMC and its TG module.

Assume now that Ext. B is answered. Upon the occurrence of that event, LSM-B sends a message to the ELT to reset the ring bit for Ext. B (step 122). The ELT, in turn, sends to LSM-B an acknowledgement message and LSM-B turns off the ring signal to Ext. B (step 124). Further, LSM-B sends a message to LSM-A indicating that Ext. B has been answered (step 126). Since the connection is now ready to be established, LSM-A sends a message to the NC to tell the master switch (MS) to connect a voice path between the two telephones (step 128). The NC causes the MS to create the connection and sends a message to LSM-B indicating the connection has been made (step 130). LSM-B then sends a message to LSM-A indicating the connection is established (step 132), upon the receipt of which the two parties are in voice contact.

The call disconnection sequence is given in FIG. 8. First, LSM-A sends to LSM-B a message requesting release from the connection (step 140). Upon receipt and processing of that message, LSM-B sends a message to the ELT to request that the two station's status bits be reset (step 142). The ELT complies and sends to LSM-A a message signifying that it is releasing the two extensions (step 144). LSM-A then sends to the NC a message requesting disconnection (step 146). The NC causes the MS to break the connection and sends to LSM-B a message so stating (step 148). LSM-B responds with a message to LSM-A advising that the disconnection has been completed (step 150). The two stations are now disconnected.

Having thus described a particular embodiment of hardware and software for the invention, it will be immediately apparent to those skilled in the art that various changes and improvements may be made thereto without departing from the spirit and scope of the invention. All such changes and improvements as are obvious to those skilled in the art are intended to be suggested by this disclosure though not expressly set forth herein. For example, the instant communication system may be used in a distributed computer network even without voice commmunications needs. Accordingly, the foregoing discussion is intended to be exemplary only, and not limiting. The invention is limited only by the following claims and equivalents thereto.

What is claimed is:

1. A distributed, digital voice/data communications and switching system for connecting stations which may provide transmission of voice only, data only or both voice and data, the system comprising:
   a. a station interface associated with each station;
   b. a plurality of nodes, each serving at least one station interface;
   c. means for interconnecting said nodes with an assembly of networks formed of at least two interlocking networks;
   d. a first one of such networks, termed the "regional ring," being a network connecting said nodes for carrying control messages transmitted among the nodes as well as packetized user data traffic transmitted between stations; and
   e. a second one of such networks, termed the voice highway, being a "star" type of network carrying digitized voice traffic and including a digital voice switch at one of the nodes and a separate communications link between that node and each other node of the system.

2. The system of claim 1, further including:
   f. a third network, termed a "nodal ring," which is a ring-type local area network interconnecting a multiplicity of station interfaces at a node.

3. The system of claim 2 wherein each node which contains a nodal ring further includes means for interconnecting its associated nodal ring with the regional ring for exchange of data traffic and with the voice highway for exchange of digitized voice traffic.

4. The system of claim 2 or claim 3 wherein the nodal ring is adapted to provide frequency-division multiplexed transmission of analog voice and digital data over common wiring.

5. The system of claim 4 wherein each station is connected with its station interface via two sets of twisted-wire pairs, each supporting transmission in one direction between the station and the interface.

6. The system of claim 2 or claim 3 wherein each node includes means for digitizing analog voice signals received at station interfaces from stations and means for converting digitized voice signals to analog form for transmission to a station.

7. The system of claim 3 wherein the means for interconnecting the nodal ring with the regional ring further includes:
   (i) means for digitizing analog voice signals received at station interfaces from stations;
   (ii) means for supplying said digitized voice signals to the voice highway;
   (iii) means for receiving digitized voice signals from the voice highway; and
   (iv) means for supplying to a destination station analog voice signals corresponding to the received digitized voice signals.

8. The system of any of claims 1-3 wherein each station may include at least one of an analog telephone, a personal computer and a data terminal.

9. The system of claim 1 wherein the regional ring is a ring type of network.

10. The system of claim 9, further including:
    f. at least one node, a third network, termed a "nodal ring," which is a ring-type local area network interconnecting a multiplicity of station interfaces at a node; and
    g. for each nodal ring, means for interconnecting said nodal ring with the regional ring for exchange of data traffic and with the voice highway for exchange of digitized voice traffic.

11. A distributed, voice and digital data communications and switching system for connecting communications stations such as telephones and personal computers, which system provides for the transmission between stations of both voice and data, the system comprising:
    a. a plurality of nodes, each including a programmed processor, the processors cooperating to control the operation of the system;
    b. a master switching unit;
    c. a star type communications network interconnecting the master switching unit and the plurality of nodes;
    d. each node including means for connecting at least one station to said communications network under control of the processor at such node;
    e. the master switching unit including a digital voice switch operable to establish digital voice communications between selected telephone stations associated with said nodes; and
    f. a ring type of network interconnecting said nodes and said master switching unit and carrying control messages transmitted among and between the nodes and master switching unit as well as digital data transmitted by at least one station.

12. A distributed, digital voice and data communications and switching system for selectively controlling communications stations such as telephone and personal computers, and providing communications paths between multiple ones of said stations, which system supports the transmission between stations of voice signals and data, the system comprising:
    a. a plurality of nodes, each having at least one processor for controlling selected aspects of system operation including aspects of operation of a set of associated stations;
    b. a master switching unit operably connected to each of said nodes, and via each node to the associated set of stations, and including a digital voice switch operable to establish voice communications between selected ones of said stations;
    c. a ring type of network connecting said nodes and said master switching unit;
    d. the node processors adapted to place on the ring network control information for the processors of other nodes and for a master switching unit;
    e. at least one node adapted to place on the ring network, for transmission to a station associated with another node, digitized data provided by a station associated with the former node.

13. The system of claim 12 wherein at least one station sends and receives only digitized data.

* * * * *